US012622769B2

(12) United States Patent
Ehmoser et al.

(10) Patent No.: US 12,622,769 B2
(45) Date of Patent: May 12, 2026

(54) DENTAL IMPLANT CONTAINER AND AN IMPLANT

(71) Applicant: Universität für Bodenkultur Wien, Vienna (AT)

(72) Inventors: Eva-Kathrin Ehmoser, Vienna (AT); Seta Küpcü, Vienna (AT); Mark Kettner, Offenbach an der Queich (DE)

(73) Assignee: Universitiit für Bodenkultur Wien, Vienna (AT)

( * ) Notice: Subject to any disclaimer, the term of this patent is extended or adjusted under 35 U.S.C. 154(b) by 4 days.

(21) Appl. No.: 18/866,662

(22) PCT Filed: May 19, 2023

(86) PCT No.: PCT/EP2023/063464
§ 371 (c)(1),
(2) Date: Nov. 18, 2024

(87) PCT Pub. No.: WO2023/222869
PCT Pub. Date: Nov. 23, 2023

(65) Prior Publication Data
US 2025/0312127 A1     Oct. 9, 2025

(30) Foreign Application Priority Data
May 19, 2022     (EP) ..................................... 22174267

(51) Int. Cl.
*A61C 8/00*          (2006.01)
*A01N 1/142*         (2025.01)

(52) U.S. Cl.
CPC ............ *A61C 8/0087* (2013.01); *A01N 1/142* (2025.01)

(58) Field of Classification Search
CPC .............................. A61C 8/0087; A01N 1/142
(Continued)

(56) References Cited

U.S. PATENT DOCUMENTS

| | | | |
|---|---|---|---|
| 5,368,160 A | 11/1994 | Leuschen et al. | |
| 6,142,296 A * | 11/2000 | Klardie ................ | A61C 8/0087 220/831 |
| 2001/0031445 A1 | 10/2001 | Arruga Artal | |
| 2007/0037123 A1 | 2/2007 | Mansueto et al. | |
| 2007/0202144 A1 | 8/2007 | Hellerbrand et al. | |
| 2011/0247947 A1* | 10/2011 | Nihei ................... | A61C 8/0087 206/63.5 |

(Continued)

FOREIGN PATENT DOCUMENTS

| | | |
|---|---|---|
| EP | 1749501 B1 | 10/2010 |
| KR | 20160007176 A | 4/2016 |

(Continued)

OTHER PUBLICATIONS

Barth L., "Selektive Bindung synthetischer Kollagenmodellpeptide mit Adhäsionsmotiv und Integrin an funktionalisierten Oberflächen und artifiziellen Membransystemen (Selective Binding of Synthetic Collagen Model Peptides with Adhesion Motif and Integrin to Functionalized Surfaces and Artificial Membrane Systems)," Dissertation, Ludwig-Maximilians-Universität München, Max-Planck-Institut für Biochemie, Faculty of Chemistry and Pharmacy, 2007, 141 pages with English summary.

(Continued)

*Primary Examiner* — Jacob K Ackun
(74) *Attorney, Agent, or Firm* — LOZA & LOZA, LLP; Michael Fedrick

(57) ABSTRACT

The present invention refers to a temperature resistant dental implant container with dental implant comprising a polygonal or cylindrical, optically transparent container with a conically tapered interior for receiving a dental implant, a needle-pierceable, flexible, and liquid-tight septum, a lid which is separably connected to the container, wherein the interior of the container is configured to fix the position of the dental implant between the bottom of the septum and the bottom of the interior, and a dental implant comprising a conditioned surface. Further its use for transport and storage, and a method for in vitro cellular coating a dental implant are described.

17 Claims, 6 Drawing Sheets

Figure 1:
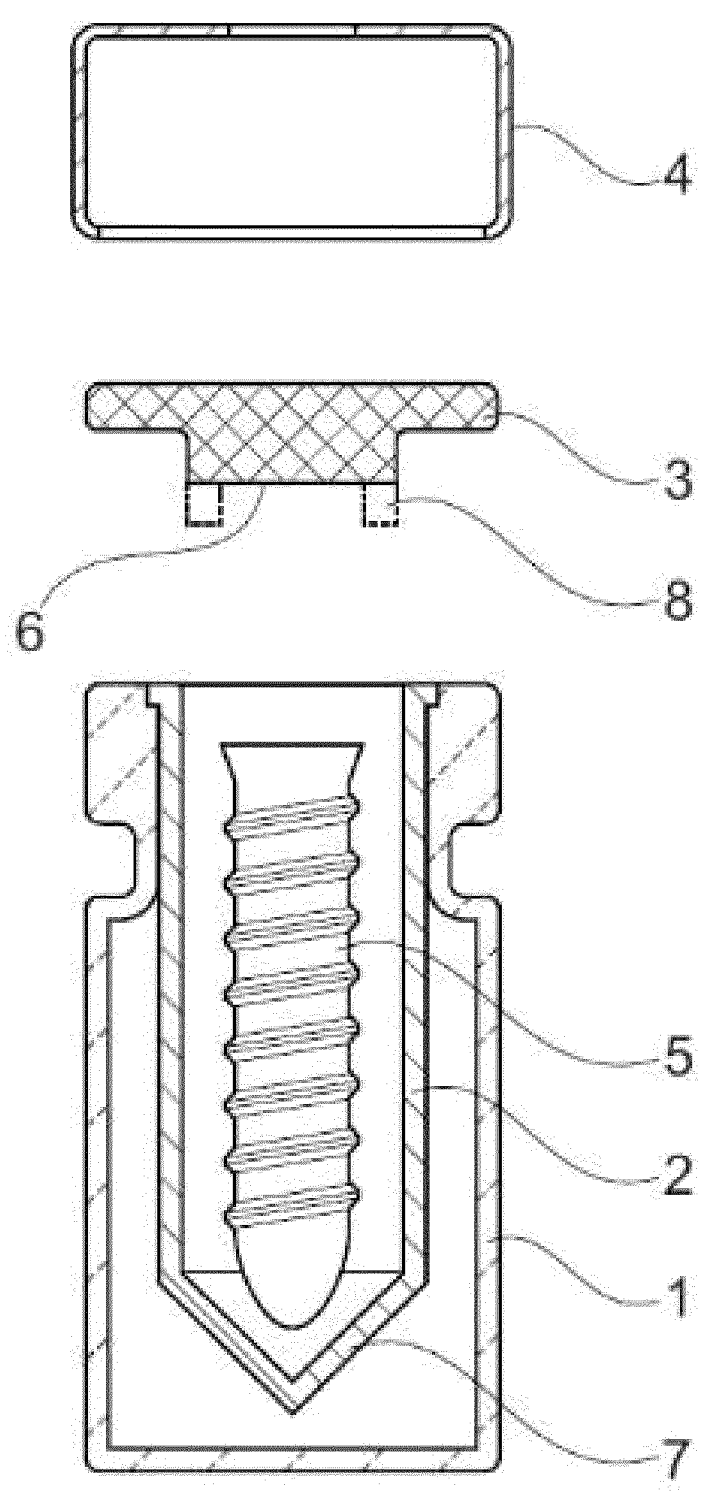

Specification includes a Sequence Listing.

(58) Field of Classification Search
USPC ........................................................ 206/63.5
See application file for complete search history.

(56) References Cited

U.S. PATENT DOCUMENTS

| 2015/0086943 | A1* | 3/2015 | Schwarz | ............. | A61C 8/0093 |
| | | | | | 216/53 |
| 2017/0143351 | A1* | 5/2017 | Devitre | ................ | A61C 8/0087 |
| 2018/0318050 | A1* | 11/2018 | Srouji | .................. | A61C 8/0087 |
| 2021/0154365 | A1 | 5/2021 | Sohn et al. | | |
| 2022/0306368 | A1* | 9/2022 | Lim | .................... | A61C 8/0087 |

FOREIGN PATENT DOCUMENTS

| TW | 201242624 A | 5/2014 |
| WO | WO9965416 A1 | 12/1999 |

OTHER PUBLICATIONS

Jurczak Przemyslaw et al., Proteins, peptides and peptidmnimetics as active agents in implant surface functionalization,: Adv in Colloid and Interface Science, 2019, vol. 276, 102083, 21 pages.

Ruoslahti E, "RGD and Other Recognition Sequences for Integrins," Annual Rev of Cell and Develop Biol, 1996, vol. 12, pp. 697-715, 19 pages.

European Search Report for corresponding European Patent Application No. 22174267.9, dated Nov. 15, 2022, 12 pages.

Search Report for corresponding European Patent Application No. PCT/EP2023/063464, dated Jul. 3, 2023, 5 pages.

International Search Report and Written Opinion for corresponding International Patent Application No. PCT/EP2023/063464, dated Jul. 3, 2023.

* cited by examiner

DENTAL IMPLANT CONTAINER AND AN IMPLANT

CROSS-REFERENCE TO RELATED APPLICATIONS

This application is the U.S. national stage of International Patent Application No. PCT/EP2023/063464, filed on May 19, 2023 and entitled IMPROVED DENTAL IMPLANT CONTAINER AND AN IMPLANT, which claims the benefit of priority under 35 U.S.C. § 119 from European Patent Application No. 22174267.9, filed on May 19, 2022. The disclosures of the foregoing applications are incorporated herein by reference in their entireties.

SEQUENCE LISTING

The entire content of a Sequence Listing titled "Sequence-_Listing.xml," created on Nov. 8, 2024 and having a size of 3 kilobytes, which has been submitted in electronic form in connection with the present application, is hereby incorporated by reference herein in its entirety.

FIELD OF THE INVENTION

The present invention refers to a temperature resistant dental implant container with dental implant comprising a polygonal or cylindrical volume and made by optically transparent material with a conically tapered interior for receiving a dental implant, a needle-pierceable, flexible, and liquid-tight septum, a lid which is separably connected to the container, wherein the interior of the container is configured to fix the position of the dental implant between the septum and the bottom of the interior, and a dental implant comprising a conditioned surface. Further its use for transport and storage, and a method for in vitro cellular coating a dental implant are described.

BACKGROUND OF THE INVENTION

An important factor in the storage and presentation of implants is to ensure the sterility of the implant arranged in a packaging sleeve.

Transport containers for dental implants on the market are often blister packs made of coated paper or transparent polymer materials. These packages are filled with the implants, sealed (glued, or welded) and then sterilized via radioactive irradiation.

Alternatively, transport containers for dental implants are provided, wherein the implants are secured to the container by specific means such as screws or specific holding elements which are connected to a tool for subsequent insertion of the implant into the human body (U.S. Pat. No. 5,368,160, EP1749501) or the container comprises mounting arrangements directly coupled to the implant (WO9965416). Dental implants are thus often not made available to dentists simply as the actual implants alone but rather are supplied from the outset as a unit with a mounting arrangement, which is let into an inner recess or outer connecting means of the implant.

US2007/037123A1 describes a dental implant with a so-called Trulock™ indexing device. Further disclosed is a sterile disposable container for storing the implant, which is sealed with a pressed-in plastic cap. The implant is fixed at the top and bottom by an indentation at the bottom of the container. The plastic cap can also be used as a disposable rotator that is held in place with the fingers.

US2018/318050A1 describes a device and a method for the treatment of an artificial bone implant with blood.

US2001/031445A1 discloses a dental implant and operative method of implantation.

KR2016 0007176A refers to an implant surface treated with gold particles.

Jurczak P. et al., report proteins, peptides and peptidomimetics as active agents in implant surface functionalization (Advance in Colloid and Interface Science, 2019, 276, 1-21.

US2007/202144A1 discloses coated devices.

Ruoslahti E. discloses RGD and other recognition sequences for integrins (Annual Reviews, vol. 12, 1996, pp. 697-715).

In addition to the requirements of safe transport and storage, there is also the need to pretreat implants before insertion in such a way that osseointegration is improved. However, this is a very critical step for the dentist or dental laboratory, because pretreating an implant, such as coating it with the patient's cells, involves the risk of microbial contamination and the risk that the cells do not sufficiently adhere to the implant surface.

Therefore, there is a high and yet unmet need for providing a system for dental implants that enables safe transport and storage and allows sterile coating of a dental implant prior to insertion.

SUMMARY OF THE INVENTION

It is thus the objective of the present invention to provide a transport container which is not only sterilizable, but in which the dental implant is fixed in such a way that the surfaces of the implant are free and stay intact. In particular, the container comprises an implant with a conditioned surface improving the coating with a patient's own material before insertion.

The objective is solved by the subject of the claims and as further described herein.

One aim of the inventive container and a dental implant with surface conditioning (doting) is that sterilization, transport, and coating of a dental implant can be performed in one system. The herein provided container comprising a dental implant, enables contacting of a patient's own cellular material with the surface of the implant and further incubation, thereby further increasing implant ingrowth. By incubating the implant with the patient's tissue, integration of the implant is more reliable and mechanically faster resilient than observed with current implant functionalization methods (e.g. via plasma or saliva coating). Even in the case of poor prognosis due to pre-existing conditions, the present container can improve the likelihood of implant ingrowth, namely by appropriate cell growth-promoting surface conditioning with known extracellular matrix proteins which can be performed at the manufacturer, or at the site of implantation.

The packaging system presented here is based on the combination of a specific container design for one or more dental implants in a mechanically stable and watertight manner, with the lateral implant surfaces freely accessible for coating.

According to the present invention herein provided is a cell culture-compatible dental implant container resistant to temperatures of 100° C. and higher with dental implant, characterized in that it comprises the following elements:

a polygonal or cylindrical, optically transparent container (1) with a conically tapered interior (2) for receiving a dental implant, a needle-pierceable, flexible, and liquid-tight septum (3), a lid (4) which is separably connected to the container,
wherein the interior of the container is configured to fix
the position of the dental implant between the bottom
of the septum (6) and the bottom of the interior (7), and
a dental implant (5), made of ceramic, plastic, or a
polymeric material, which is doted by or comprises a
noble metal for self-assembly with one or more cell
adhesion motifs, peptides, proteins and/or glycopro-
teins, specifically by physisorption.

Specifically, the dental implant (5) is made of bioceramic.

According to one embodiment, the noble metal is doted
(spiked) into the dental implant.

According to a further embodiment, the noble metal is
spiked into the dental implant before sintering.

Specifically, the noble metal doted by sputtering, electro-
thermal deposition, or chemical deposition.

In one embodiment, the noble metal is selected from the
group consisting of platinum, titanium, gold, and silver, and
an alloy of one or more of platinum, titanium, gold, and
silver.

The dental implant container according to any of claims
1 to 6, characterized in that the dental implant comprising
the noble meta provides binding sites, preferably for binding
of proteins, cells or cell extracts, preferably bone-forming
cells from blood, plasma, saliva, or tissue, specifically the
proteins are selected from extracellular matrix proteins,
specifically selected from the group consisting of RGD-
peptides, specifically GRGDS, collagen, vitronectin,
fibronectin, periostin, F-actin, paxillin, tropoelastin, focal
adhesion kinase, integrin, tenascin C, and bone sialoprotein.

In a further embodiment, the dental implant (5) is a
ceramic implant, further comprising or conditioned with
titanium, zirconia, platinum, gold, or silver.

In yet a further embodiment, the dental implant (5)
comprises sulfur molecules adhesively attached to the sur-
face of said implant via noble metal interaction, specifically
sulfur molecules adhesively attached to a noble-metal, e.g.
platinum conditioned implant.

Specifically, the container is made of sterilizable glass or
plastics.

In a further embodiment, the lid (4) is made of metal,
optionally it has a twist lock or flare closure.

Specifically, the septum comprises an inner ring for
insertion of the dental implant, preferably allowing free
access to the lateral surfaces of said implant.

More specifically, the septum is made of a material
selected from the group consisting of silicone, PTFE, rubber,
fluoroelastomer, and silicone.

According to an embodiment of the invention, the dental
implant container described herein can be sterilized, in
particular by radiation, dry heat, wet sterilization, more
specifically it can be sterilized two or more times.

The present invention further provides a method for in
vitro coating of a dental implant with cellular material inside
a dental implant container, comprising the sequential steps:
a) introducing cellular material from a patient sample into
a dental implant container described herein via the
pierceable septum,
b) incubating the dental implant with said cellular mate-
rial, optionally in the presence of a cell culture medium,
optionally further containing an antibiotic, under con-
ditions to allow cell adhesion and growth on the
implant surface.

Specifically, the cellular material is from blood, plasma,
saliva, biopsy material, or tissue or any cell extracts thereof.
Specifically, the cellular material is an autologous material,
specifically an autologous whole blood sample.

More specifically, the cellular material is selected from
the group consisting of proteins, cells, cell extracts, specifi-
cally the proteins are selected from extracellular matrix
proteins, selected from the group consisting of collagen,
vitronectin, fibronectin, periostin, F-actin, paxillin, tro-
poelastin, focal adhesion kinase, integrin, tenascin C, and
bone sialoprotein.

Specifically, the dental implant is coated before or after
sterilization.

According to the present invention, herein provided is
also the use of the dental implant container of the present
invention for performing the method described herein, or for
storing and/or transporting a dental implant, optionally in
combination with a packaging, optionally a heat shrinkable
tubing.

According to a further embodiment of the invention, a
ceramic dental implant is provided, characterized in that is
doted with a noble metal, specifically selected from the
group consisting of ruthenium, iridium, gold, silver or
platinum or any combination thereof, thereby providing
protein binding sites.

Further provided is a dental implant, characterized in that
it comprises a titanium or titanium alloy surface and sulfur
molecules directly attached to said titanium surface, further
comprising proteins, specifically selected from extracellular
matrix proteins, more specifically selected from the group
consisting of collagen, vitronectin, fibronectin, periostin,
F-actin, paxillin, tropoelastin, focal adhesion kinase, integ-
rin, tenascin C, and bone sialoprotein.

FIGURES

FIG. 1: Sectional view of the dental implant container
with dental implant according to the invention.

Figure 2:
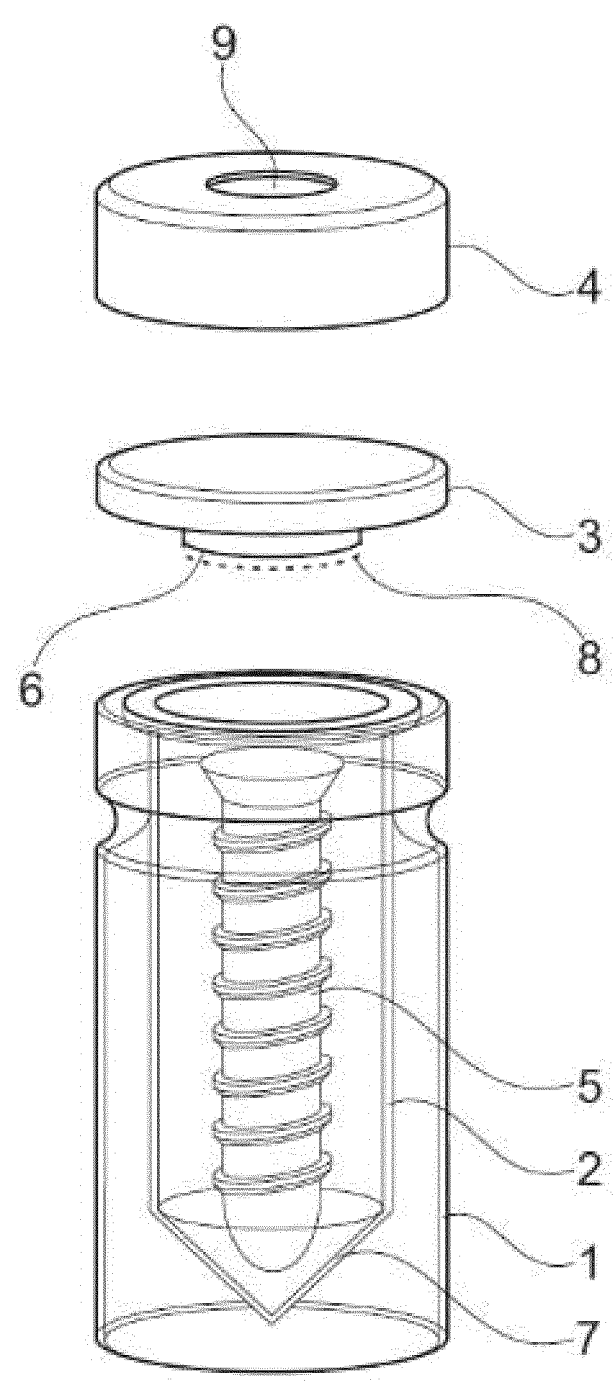

FIG. 2: View of the dental implant container with dental
implant according to the invention.

Figure 3:
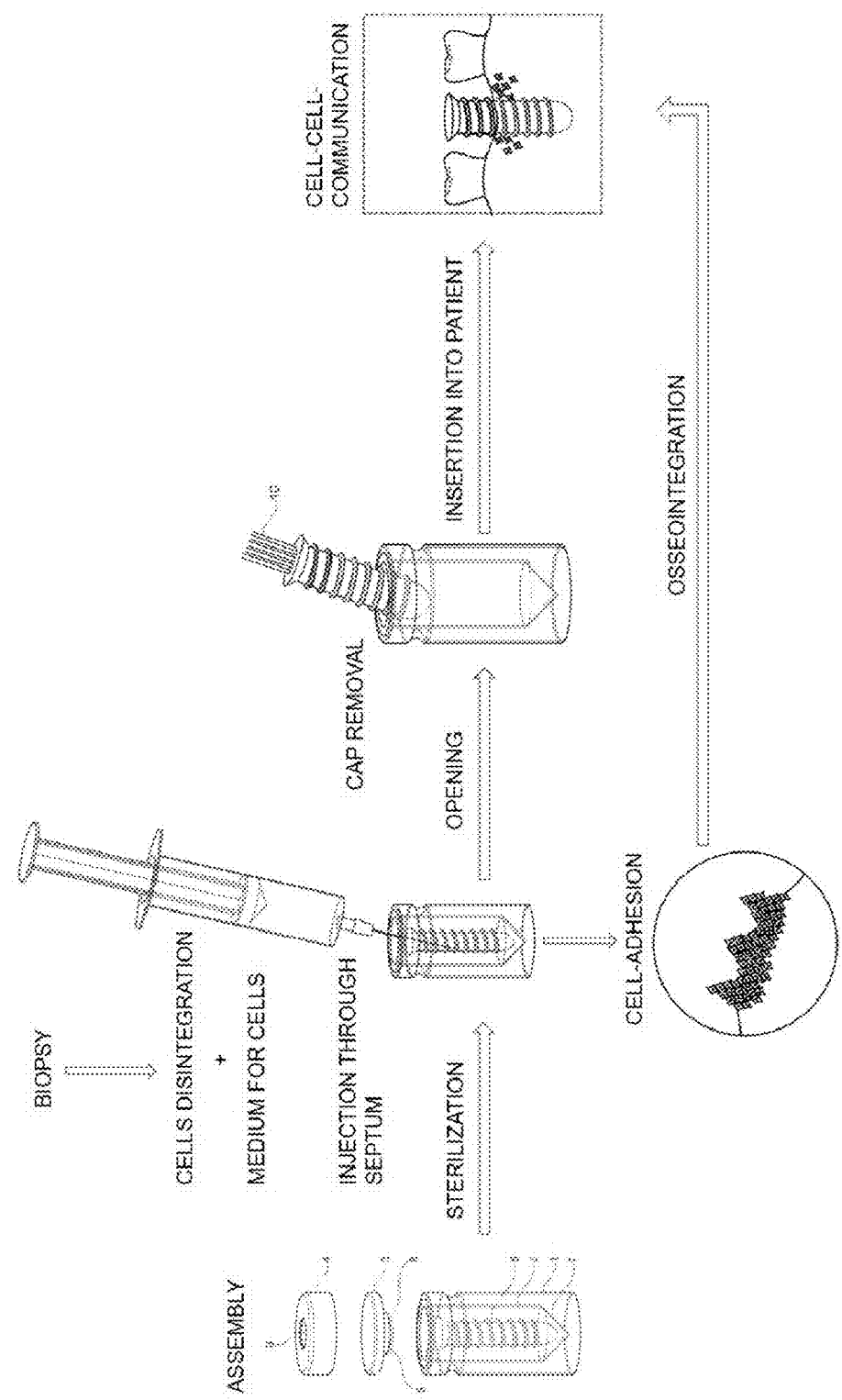

FIG. 3: Schematic of implant functionalization. Cells
from a biopsy sample, optionally together with a cultivation
medium or buffer, are injected via a syringe into the dental
implant container. After incubation of said cells, thereby
allowing adhesion to the implant, the container is opened by
removing the lid and the septum, the implant is removed and
inserted into the target area of a subject. Due to osseointe-
gration, said implant is integrated into the target area.

Figure 4:
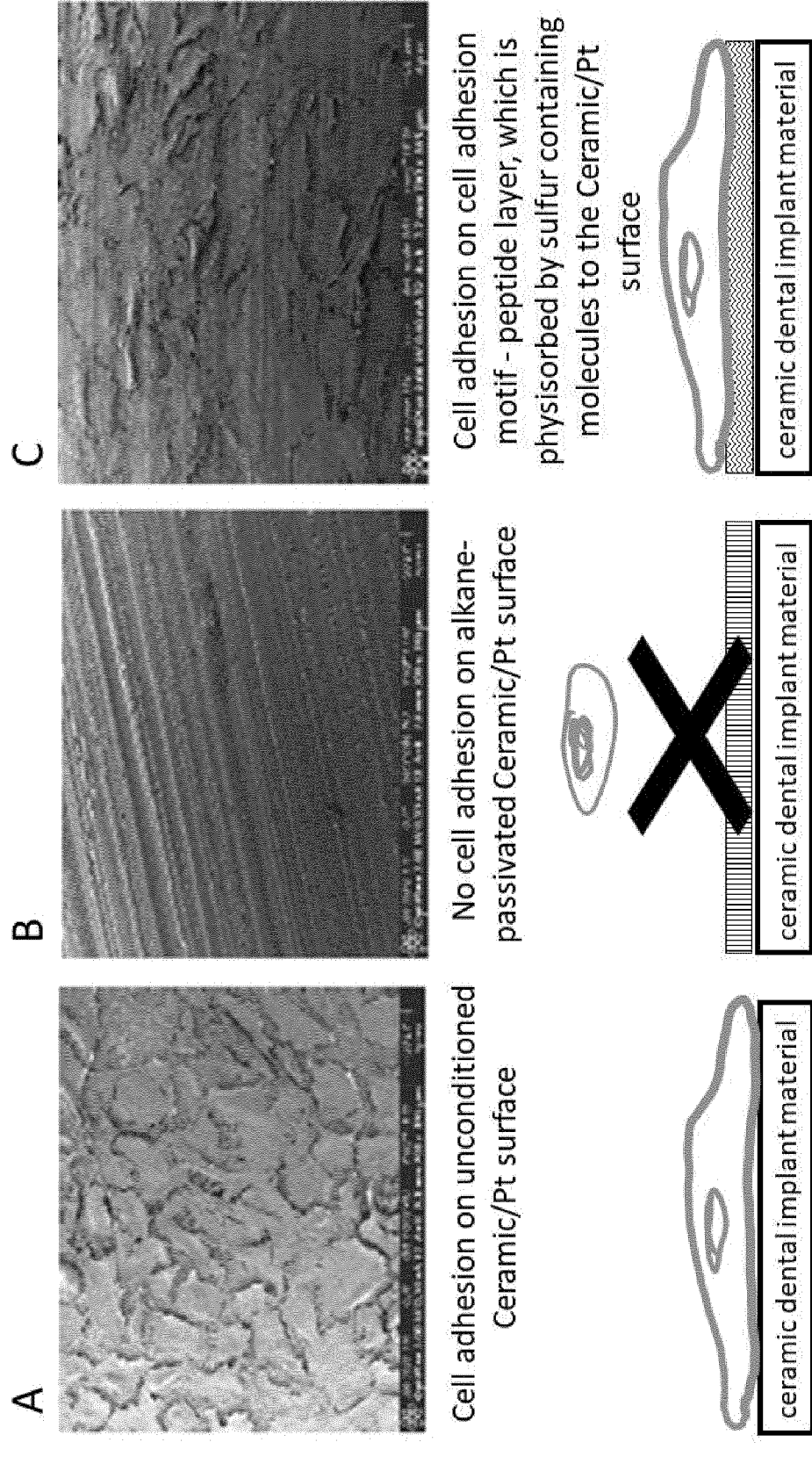

FIG. 4: Examples of platinum-doted ceramic surfaces in
the presence of the human osteoblast cell line, HOB. Cells
were previously added for 2-3 hours and incubated in the
dental implant container as described herein in suitable
medium and conditions. Fluorescence imaging was applied
to demonstrate viability of the adherent cells by viability
marker staining. For better visibility, subsequent fixation
followed by scanning electron microscopical analysis was
performed. In (A), cell adhesion onto an unconditioned
platinum-ceramic surface is shown with the cross section of
such a surface being outlined below as a graphical depiction.
In (B), a platinum-ceramic surface with a self-assembled
sulfur-alkane layer is shown. The passivating function of
this sulfur-alkane layer results in no cell adhesion, which is
clearly observed as no cell attachment occurred even after
prolonged exposure to cells. In (C), the successful and
highly efficient cell adhesion demonstrates the suitability of
surface conditioning in which a sulfur-linker molecule (such
as L-Cysteine, L-Cystine, α-Lipoic acid, N-acetyl-L-Cyste-
ine and Cystamine) is added to the surface and self-assembly
into an oriented layer is allowed with functional carboxyl
groups being exposed. By succinimide ester chemistry, the
amino-termini of linear cell adhesion peptides from the RGD family are chemisorbed, rinsed and immerse in cell culture medium, and added HOB cells do attach, thereby timely forming a confluent cell layer and presenting quickly the typical morphology for this cellular species.

Figure 5:
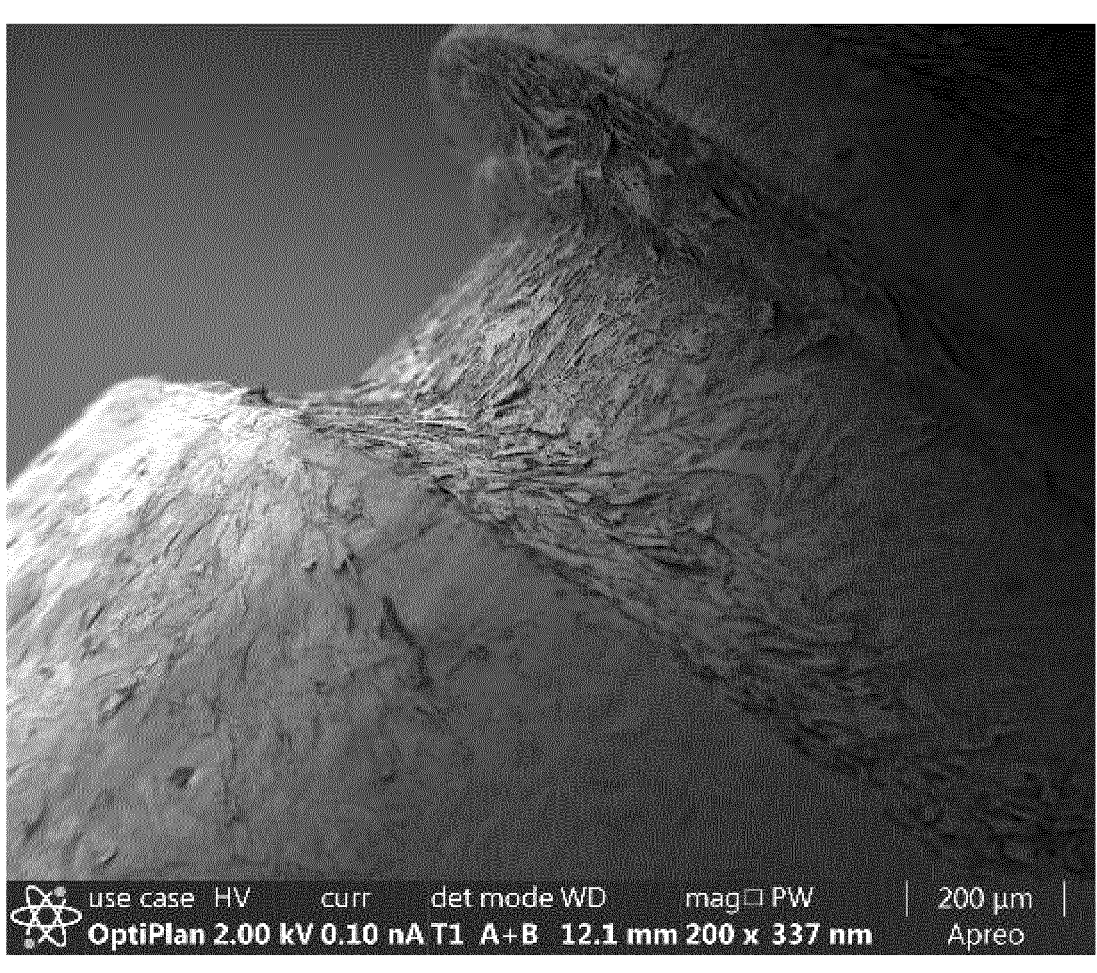

FIG. 5: Successful cell growth on platinum-doted ceramic dental implant surfaces inside the described container in an overnight experiment.

Figure 6:
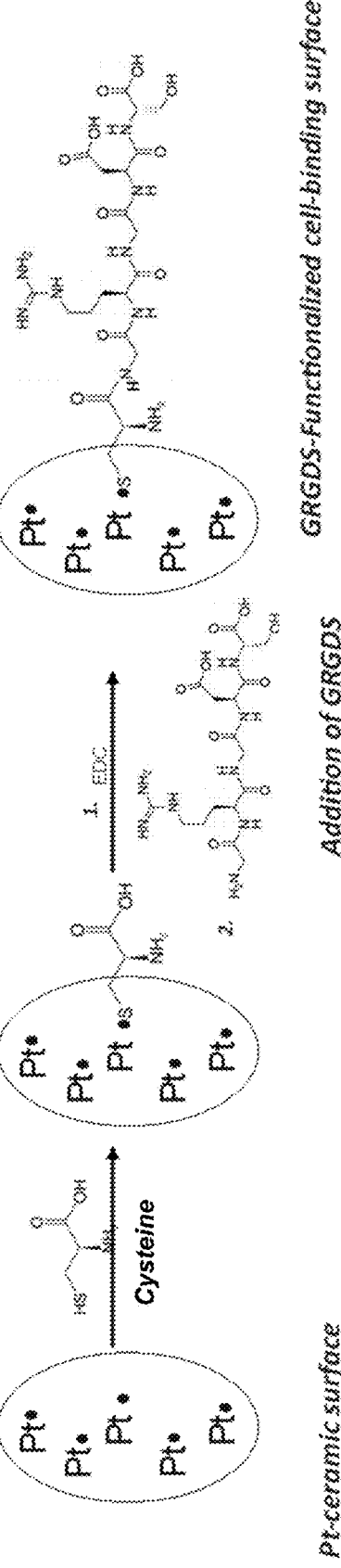

FIG. 6: Schematic overview on surface chemistry of ceramic-Pt, decorated with cysteine as an exemplary, sulfur-containing moiety.

DETAILED DESCRIPTION

The terms "comprise", "contain", "have" and "include" as used herein can be used synonymously and shall be understood as an open definition, allowing further members or parts or elements. "Consisting" is considered as a closest definition without further elements of the consisting definition feature. Thus "comprising" is broader and contains the "consisting" definition.

The term "about" as used herein refers to the same value or a value differing by +/−5% of the given value.

As used herein and in the claims, the singular form, for example "a", "an" and "the" includes the plural, unless the context clearly dictates otherwise.

The terms "subject", "patient" or "individual" can be used interchangeably.

According to one embodiment, the patient is a human being.

Referring to FIG. 1, the dental implant container of the invention includes a main body 1, having a conically tapered interior 2, a pierceable, flexible and liquid tight septum 3, a lid 4 on top of the container, which is separably connected to the container, and a dental implant 5 immobilized between the bottom of the septum 6 and the bottom of the interior 7. Said septum may optionally comprise an inner ring 8 for inserting the dental implant. The lid can further comprise an opening 9 to allow direct penetration of the septum by a needle.

The implant can be removed from the container by any applicable means 10, such as, but not limited to small pliers or tweezers.

The lid 4 may have a twist lock or a flare closure.

The term "temperature resistant" refers to any material resistant to temperatures≧100° C., specifically >120° C., >130° C., >150° C., >160° C.

The implant container can be sterilized by any method known in the art to remove, kill, or deactivate all forms of microorganisms. Sterilization can be performed by heat, chemicals, irradiation, high pressure, such as dry heat or wet sterilization (autoclaving), steam sterilization, or ionizing radiation sterilization.

Sterilization of the dental container of the invention can be performed once, but can be repeated 2, 3, 4 or more times.

The implant container is of polygonal or cylindrical shape with a conically tapered interior part which receives the dental implant. The container may be round, polygonal, e.g. hexagonal, heptagonal, octagonal, nonagonal, decagonal etc., or may have any suitable shape. The container may have any diameter and length so long as a typical dental implant can be received in the interior part, specifically the cylinder has a length in the range of about 10 mm to 35 mm and a diameter of about 4 mm to 20 mm. The volume of the conically tapered interior of the container may be about 0.5 to 5 ml, specifically about 0.5 to 1 ml.

The container, however, may be also larger.

The container is transparent to allow the dental implant contained therein and also growth of cells to be observed from the outside. Also, color of the medium as function of $CO_2$ content can easily be checked thereby.

The container described herein can be made of any material, specifically temperature resistant, specifically resistant to temperatures of ≧100° C., and transparent glass or plastics, specifically heat resistant glass or plastics.

Lid and septum are flexibly fastened to the container, however in view of preserving sterility of the dental implant, these two parts should only be fully removed when the implant is taken out of the container.

The lid can be made of any material, specifically it is made of plastics or metal, specifically it is made of aluminum.

The needle-pierceable septum can be made of any material, such as but not limited to silicone, polytetrafluorethylene (PTFE, Teflon®), fluoroelastomer, silicone, and rubber, butyl rubber, or any combination thereof. The septum may also comprise several layers of the same or different materials. Specifically, the septum protrudes into the container, more specifically the septum has an inner ring that further protrudes into the container. Gas or liquid material, such as cultivation medium, antibiotics or cellular suspensions can be once or repeatedly introduced into the container by piercing the septum.

"Needle-piercable" means that standard injection needles or syringes can penetrate the septum by manual force to provide liquids to the interior of the container.

Specifically, septum and lid are fixed to the body of the container so that the container is water tight, while low amounts of gas may be exchanged with the outside. Specifically, the septum and lid are mechanically connected to the container without any adhesives so that gas exchange is sufficiently provided in order to allow cell growth over several hours.

The interior of the container is configured to fix the position of an implant, specifically a dental implant between the bottom of the septum and the bottom of the interior. Fixing can be by exerting a slight pressure on the implant so that it is clamped between the septum and the bottom of the interior. Immobilization may be further improved using a septum with an inner ring. The dental implant is removably inserted into said ring, whereby it is held.

In an additional embodiment, the container may further comprise a flexible ring which can be positioned on the bottom of the interior so that the implant is additionally stabilized while minimal compromising the surface's integrity. Due to immobilization, the lateral surfaces may lie completely free and access to the lateral surfaces of the implant is allowed.

The implant used herein can be e.g. a dental implant or a bone substitute. The dental implant as used herein can be of any shape, material, or size, and is a prosthesis that interfaces with the bone of the jaw or skull to support a dental prosthesis such as a crown, bridge, denture, or facial prosthesis or to act as an orthodontic anchor. The implant can include a radicular part and a coronary part. Such implant for example can be a screw, such as an abutment screw.

One of the processes that promote proper settlement of the artificial bone implant in a bone tissue is osseointegration, also known as osseointegration. Osseointegration is a direct structural and functional connection between a living bone and a surface of an artificial bone implant. In other words, osseointegration may be defined as formation of a direct interface between an artificial bone implant and bone, without intervening soft tissue. This is achieved by a structural linkage made at a contact point between a bone and a surface of an artificial bone implant. The basis for dental implants is thus osseointegration, in which the respective material of the implant or at least part of it forms an intimate bond to bone. It is appreciated that acceleration of the osseointegration process of artificial bone implants is of importance, for example in order to shorten the recovery period after placing an artificial bone implant in a bone tissue. Of great importance is the acceleration of osseointegration of dental implants, as further steps are required following placing the dental implant, such as attachment of a dental prosthetic, for example a tooth, a bridge or a denture, to the implant, or placing an abutment that will hold a dental prosthetic. However, advance to these further steps depends on healing of the tissue surrounding the implant. Accelerated osseointegration of the dental implant shortens the healing time after placing the dental implant and expedites the entire process of dental implantation.

The implant can be made of any material appropriate in oral surgery, e.g. it can be composed of metal, semimetal, metal oxide, specifically titanium, zirconia, zirconium oxide, plastic, titanium oxide, hydroxy apatite, polymeric materials, biological glass, or ceramic.

According to the embodiment, the implant is made of ceramic, specifically bioceramic, plastic or a polymeric material.

Bioceramics are closely related to the body's own materials or are extremely durable metal oxides.

The nature of the implant surface is highly important for successful dental implanting. The dental implant of the present invention therefore comprises preferably but not restricted to a modified, pretreated, surface conditioned by a noble metal doting, coating with a cell adhesion motif, coating with extracellular matrix proteins, or microstructures or any combination thereof.

The term "conditioning" refers to the surface modification, specifically functionalization by chemical or physical treatments of the implant surfaces to increase osseointegration properties of the implant. Exemplary methods are known in the art, such as, but not limited to, conditioning with metals, cell adhesion motifs of synthetic origin, material extracts, e.g. extracellular matrix proteins or plasma fractions, microstructuring and general increase of surface area by roughening procedures and any combinations thereof.

The term "metal conditioning" refers to depositing of metal ions on the implant surface. One non limiting example is depositing a metal thin film, such that the surface of the implant is uniformly covered by a metal, specifically any noble (precious) metal, such as titanium, zirconia, platinum, gold, silver, aluminum, palladium, iridium, an alloy of one or more of said metals, specifically an alloy comprising gold, palladium and iridium, or any combination these materials. The thickness of the film may be in the nanometers range, such as a few nanometers thick, preferably around about 1 nm to about 50 nm in thickness. Specifically, the content of platin may be <2%.

One aspect of metal conditioning is by doting of ceramic implant materials with noble metals, to create metal isles on the implant.

The terms "doting", "doping" and "spiking" are used interchangeably herein. Doting may be by admixture or evaporation during a sintering process, thereby allowing the generation of binding sites in a broad distribution ratio on the implant surface, to which e.g. adhesion motifs for bone-forming cells can be irreversibly bound. Doting allows conditioning of implant surfaces without the use of chemical coupling reactions. E.g., interaction between sulfur compounds and metals is because noble metals and sulfur interact, based on charge density distribution of electrons, existing on metal surfaces. This allows an interaction strength ranking only slightly below a covalent interaction. Thereby proteins having amino acid sequences starting with the sulfur-containing amino acid methionine can be bound to the implant surface.

Conditioning, e.g. via self-assembly, can be achieved via physisorption in combination with or solely via metal-anchor points of the implant surfaces, enabling a sulfur-noble metal interaction, similar e.g. to the interaction used in interface functionalization for surface plasmon spectroscopy chips.

Individualization of surface conditioning comprises coating the implant surface with non-specific, specific, physisorbed and chemisorbed materials and agents.

Physisorption is a process in which the electronic structure of the interacting material is barely perturbed upon adsorption. Physisorption describes layer formation at interfaces without covalent linkage, but solely based on ionic interactions. Physisorbed layers may form with no ionic or covalent binding involved.

Chemisorption is based on an ionic or covalent interaction. Non-limiting examples for chemisorption of materials on surfaces are antibody-antigen interactions which are based in ionic interactions, or a chemical coupling reaction, such as condensation reaction.

An anchor point refers to a consequence of spiking the implant material with precious, specifically noble metals-either by mixing the implant material before formation of the solid implant body, or by evaporation, sputtering or chemical precipitation of the noble metal onto the implant surface, resulting in metal 'islands', e.g. the anchor points. Those anchoring points provide an electron gas to conduct the sulfur-metal interaction, resulting in a binding-motif-functionalized surface.

Conditioning of the dental implant can also be performed by self-assembly with cell adhesion motifs or extracellular matrix proteins. Self-assembly can be mediated by bonds that break and reassemble quickly: non-covalent interactions, such as hydrogen bonding, Van der Waal's interactions, hydrophobic interactions, ionic interactions, pi-pi-stacking, and combinations thereof. Proteins, peptides or polypeptides from a patient's sample or from the culture medium introduced into the dental implant container by injection through the septum can thus be attached to the surface of the implant This allows individualization of the implant surface with specific biologically active motifs, allowing further individualization by living cells. Cell adhesion motifs can be of synthetic or natural origin, non-limiting examples are the arginine-glycine-aspartic acid (RGD) sequence, leucine-aspartic acid-valine (LDV), collagens, GRKRK motif or tropoelastin, and adhesion motif-functionalized peptides and/or polymers.

The conditioned surface provides binding sites, specifically for binding of peptides, proteins, cells or cell extracts. These compounds may be recombinant, native, from plant, animal, or synthetic compounds. Binding may also be of any biological material derived from synthetic sources as well as derived from cellular origin, such as plasma, blood, crude extracts, purified material from heterologous expression hosts, such as derived from bacterial species, insects, plants and yeast.

Specifically, bone forming cells can be attached, specifically from a subject's sample, such as blood, plasma, saliva, tissue such as biopsy tissue.

Binding can be specific or unspecific binding, e.g. any of condensation reaction, additive reaction, self-organization, electrochemical reaction, enzymatically catalysed reaction, exchange reaction.

The proteins may be extracellular matrix proteins, such as collagen, vitronectin, fibronectin, periostin, F-actin, paxillin, tropoelastin, focal adhesion kinase, integrin, tenascin C, bone marrow cells, and bone sialoprotein or cellular molecules such as e.g. chondroitin sulfate.

The term "microstructure" refers to microscale and nanoscale structures (micro-structures, nano-structures) on the dental implant surface. Examples are titanium-bearing implants having surfaces with surface roughnesses and surface porosities tailored by microscale and/or nanoscale structures, or titanium and titanium alloys that may possess an attractive combination of properties, including biocompatibility, a high strength-to-weight ratio, and corrosion resistance. Titanium-based materials with nanostructures and microstructures on surfaces thereof can exhibit enhanced interactions with bone-forming cells. Methods for developing nano- and micro-structured surfaces on titanium-based biomedical implants are known to the skilled person.

Microstructuring may be performed by printing procedures, laser ablation, chemical and or physical treatment, employing a metal-enabled chemical interaction with cell adhesion motifs of synthetic or natural origin.

In addition to the container described herein, also a specific ceramic dental implant, is described herein which is doted with gold, silver or platinum or any combination thereof, thereby providing protein binding sites for self-assembly.

Further, a dental implant made of ceramics, plastics or polymeric materials, e.g. polyether ketone (PEEK), with a titanium or titanium alloy surface and sulfur molecules directly attached thereto is described herein, further comprising any of extracellular matrix proteins, e.g. collagen, vitronectin, fibronectin, periostin, F-actin, paxillin, elastin, tropoelastin, focal adhesion kinase, integrin, tenascin C, bone sialoprotein; bone marrow cells; or chondroitin sulfate.

The container of the invention allows coating of a dental implant with any cellular material without the need of an elaborate laboratory equipment such as a sterile bank because it is possible to repeatedly inject or remove solutions and cells or cellular suspensions via a syringe through the flexible septum without risk of contaminating the dental implant. In addition, the conically tapered interior provides a reduced internal volume thereby allowing the use of very small amounts of cellular material and cultivation medium or other solutions, but at the same time allowing the entire surface of the implant to be evenly surrounded by cells and solution. This ensures a uniform coating while the inside of the container and the dental implant remain sterile and the implant is mechanically stable positioned.

One method for in vitro coating of the dental implant with cellular material inside the dental implant container described herein comprises the following steps:

a) injecting cellular material from a patient sample into the inventive dental implant container described herein via the pierceable septum, b) incubating the dental implant with said cellular material, optionally in the presence of a cell culture medium, optionally further containing an antibiotic, under conditions to allow cell adhesion and growth on the implant surface, and c) taking off the septum and lid and removing the coated implant from the container, especially without damaging tissues adhering to the surface of the implant.

As described above, the cellular material can be obtained from a patient, specifically it can be a blood sample, plasma sample, saliva, biopsy material, bone marrow cells, or tissue sample or any cell extracts derived therefrom. Cellular material can be any proteins, cells, cell extracts. The proteins can be extracellular matrix proteins, such as collagen, vitronectin, fibronectin, periostin, F-actin, paxillin, tropoelastin, focal adhesion kinase, integrin, tenascin C, and bone sialoprotein or a compound such as chondroitin sulfate.

The container according to the invention can be used for the culture of different cell types and the preparation of implants of a variety of forms, compositions and applications. Notably, one can cite fibroblasts, cementoblasts, chondrocytes, etc. Particular examples of cells are fibroblasts of the dermis, buccal mucosa, gums, alveolo-dental ligaments (desmodontal), chondrocytes, or precursors of these cells. In addition, the cell populations used can be mixed populations, comprising different cell types. The cells can be autologous, allogenic or xenogenic. It can involve primary cultures or established lines. It involves, preferably, human cells or cells of human origin. They can be used in the form of a suspension, aggregates, colonies, layers, possibly in a natural or synthetic extracellular matrix allowing enhanced adhesion to the implant core. In addition, the cells can be genetically modified cells, i.e. containing a recombinant nucleic acid giving them beneficial properties.

Incubation can be at any temperature appropriate for cultivating of cells, specifically at a temperature in the range of 20° C. to 37° C., specifically in the range of 22° C. to 37° C.

Cultivation medium can be any medium applicable for cell cultivation of human cells. Alternatively, patient material such as plasma may be used as cultivation medium.

Any antibiotics may be added to the culture medium, optionally it can be amphotericins, amoxicillin, penicillin, specifically penicillin G or V, flucloxacillin, cephalexin, clindamycin, azithromycin, cephalosporins, or antibiotics in combination with further active agents such as tazobactam, sulbactam or clavulanic acid.

As described above, the dental implant container is useful for performing the method described herein, or for storing and/or transporting a dental implant. The container may further be packaged, e.g. in a heat shrinkable tubing.

The following items are particular embodiments described herein:

1. A temperature resistant dental implant container with dental implant, characterized in that it comprises the following elements:

a cylindrical, optically transparent container (1) with a conically tapered interior (2) for receiving a dental implant, a pierceable, flexible, and liquid-tight septum (3), a lid (4) which is separably connected to the container, wherein the interior of the container is configured to fix the position of the dental implant between the bottom of the septum (6) and the bottom of the interior (7), and a dental implant (5) comprising a conditioned surface, wherein the surface is conditioned by any one of a metal conditioning, coating with a cell adhesion motif, coating with extracellular matrix proteins, or microstructuring, or a combination thereof.

2. The dental implant container according to item 1, characterized in that the dental implant (5) is made of metal, semimetal, metal oxide, specifically titanium, zirconium oxide, plastic, or ceramic, specifically of bioceramic.

3. The dental implant container according to item 1 or 2, characterized in that the metal conditioning is selected from the group consisting of platinum, titanium, gold, and silver conditioning or an alloy of one or more of said metals.

4. A cell culture-compatible dental implant container resistant to temperatures of 100° C. and higher with dental implant, characterized in that it comprises the following elements:

a cylindrical, optically transparent container (1) with a conically tapered interior (2) for receiving a dental implant, a needle-pierceable, flexible, and liquid-tight septum (3), a lid (4) which is separably connected to the container, wherein the interior of the container is configured to fix the position of the dental implant between the bottom of the septum (6) and the bottom of the interior (7), and a dental implant (5), made of ceramic, plastic, or a polymeric material, which is doted by or comprises a noble metal for self-assembly with one or more cell adhesion motifs, peptides, proteins and/or glycoproteins.

5. The dental implant container according to item 4, characterized in that the dental implant (5) is made of bioceramic.

6. The dental implant container according to any one of items claims 1 to 5, characterized in that the noble metal is doted into the dental implant.

7. The dental implant container according to any one of items claims 1 to 6, characterized in that the noble metal is doted into the dental implant before sintering.

8. The dental implant container according to any one of items 1 to 7, characterized in that the noble metal is applied on the implant surface by sputtering, electrothermal deposition, or chemical deposition.

9. The dental implant container according to any one of items 1 to 8, wherein the noble metal is selected from the group consisting of platinum, titanium, gold, and silver, and an alloy of one or more of platinum, titanium, gold, and silver.

10. The dental implant container according to any of items 1 to 9, characterized in that the noble metal provides binding sites, preferably for binding of proteins, cells or cell extracts, preferably bone-forming cells from blood, plasma, saliva, or tissue, specifically the proteins are selected from extracellular matrix proteins, specifically selected from the group consisting of RGD-peptides, specifically GRGDS, collagen, vitronectin, fibronectin, periostin, F-actin, paxillin, tropoelastin, focal adhesion kinase, integrin, tenascin C, and bone sialoprotein.

11. The dental implant container according to any one of items 1 to 10, characterized in that the metal conditioning is via physisorption or anchor points of the implant.

12. The dental implant container according to any one of items 1 to 11, characterized in that the cell adhesion motif is an arginine-glycine-aspartic acid (RGD) sequence.

13. The dental implant container according to any of items 1 to 12, characterized in that the conditioned surface of the dental implant (5) has binding sites, preferably for binding of proteins, cells or cell extracts, preferably bone-forming cells from blood, plasma, saliva, or tissue.

14. The dental implant container according to item 13, characterized in that the proteins are selected from extracellular matrix proteins, specifically selected from the group consisting of collagen, vitronectin, fibronectin, periostin, F-actin, paxillin, tropoelastin, focal adhesion kinase, integrin, tenascin C, and bone sialoprotein.

15. The dental implant container according to any of items 1 to 14, characterized in that the dental implant (5) is a ceramic implant, further comprising or conditioned with titanium, zirconia, platinum, gold or silver molecules.

16. The dental implant container according to item 15, characterized in that the dental implant (5) comprises sulfur molecules adhesively attached to the surface of said implant, specifically sulfur molecules adhesively attached to a titanium conditioned implant.

17. The dental implant container according to any of items 1 to 16, characterized in that the container is made of sterilizable glass or plastics.

18. The dental implant container according to one of items 1 to 17, characterized in that the lid (4) is made of metal, optionally it has a twist lock or flare closure.

19. The dental implant container according to one of items 1 to 18, characterized in that the septum (3) comprises an inner ring for insertion of the dental implant (5), preferably allowing free access to the lateral surfaces of said implant.

20. The dental implant container according to one of items 1 to 19, characterized in that the septum (3) is made of a material selected from the group consisting of silicone, PTFE, rubber, fluoroelastomer, and silicone.

21. The dental implant container according to one of items 1 to 20, characterized in that it can be sterilized, in particular by radiation, dry heat, wet sterilization, more specifically it can be sterilized two or more times.

22. A method for in vitro coating of a dental implant with cellular material inside a dental implant container, comprising the sequential steps:

a) introducing cellular material from a patient sample into a dental implant container according to any of items 1 to 21 via the pierceable septum, b) incubating the dental implant (5) with said cellular material, optionally in the presence of a cell culture medium, optionally further containing an antibiotic, under conditions to allow cell adhesion and growth on the implant surface.

23. The method according to item 22, characterized in that the cellular material is from blood, plasma, saliva, biopsy material, or tissue or any cell extracts thereof.

24. The method according to item 22 or 23, characterized in that the cellular material is selected from the group consisting of proteins, cells, cell extracts, specifically the proteins are selected from extracellular matrix proteins, selected from the group consisting of collagen, vitronectin, fibronectin, periostin, F-actin, paxillin, tropoelastin, focal adhesion kinase, integrin, tenascin C, and bone sialoprotein.

25. The method according to any one of items 22 to 24, wherein the dental implant (5) is coated before or after sterilization.

26. Use of the dental implant container according to any of items 1 to 21 for performing the method according to any one of items 22 to 25, or for storing and/or transporting a dental implant (5), optionally in combination with a packaging, optionally a heat shrinkable tubing.

27. A ceramic dental implant, characterized in that is doped (doted) with a noble metal, specifically selected from the group consisting of ruthenium, iridium, gold, silver, platinum or any combination thereof, thereby providing protein binding sites.

28. A dental implant, characterized in that it comprises a titanium or titanium alloy surface and sulfur molecules directly attached to said titanium surface, further comprising proteins, specifically selected from extracellular matrix proteins, more specifically selected from the group consisting of collagen, vitronectin, fibronectin, periostin, F-actin, paxillin, tropoelastin, focal adhesion kinase, integrin, tenascin C, and bone sialoprotein.

EXAMPLES

The examples described herein are illustrative of the present invention and are not intended to be limitations thereon. Different embodiments of the present invention have been described according to the present invention. Many modifications and variations may be made to the techniques described and illustrated herein without departing from the scope of the invention.

Example 1

Gold-Sulfur Mediated Interaction:

Experimental examples of performing surface functionalization employing the Au—S interaction can be found in literature. One example is described by Barth L., 2007 ("Selektive Bindung synthetischer Kollagenmodellpeptide mit Adhäsionsmotiv und Integrin an funktionalisierten Oberflächen und artifiziellen Membransystemen, Dissertation, https://edoc.ub.uni-muenchen.de/7662/1/Barth_Leslie.pdf):

An approx. 5 nm thin gold film was prepared on a standard microscopic slide (float glass) by electrothermal evaporation using a 10 kV electron gun in ultra-high vacuum.

A phosphate buffer solution of 0.1 mg/ml 19 amino acid sequence with a cysteine-peptide moiety at the N-terminus (Sigma Aldrich C6171) was mixed, and a volume, ranging from 10 to 100 µl was added on the aforementioned gold film with a micropipette.

A droplet of this solution was incubated in a cell culture incubator for half an hour, positioned in a standard petri dish, providing sufficient humidity to not evaporate, at 37° C. to enable self-assembly of the peptide onto the gold surface, promoted through S—Au interaction.

Subsequently, specific cell growth is observed upon presenting cell-specific binding motifs, localized with the cysteine-peptide as described in Barth L., 2007.

This experiment presents an example to demonstrate the robustness of the Au-Sulfur interaction for immobilizing functional moieties on noble (precious) metal surfaces.

FIG. 3 shows a schematic of implant functionalization. Cells from in vitro cell culture or a biopsy sample, optionally together with a cultivation medium or buffer, are injected via a syringe into the dental implant container. Alternatively, a suitable cell culture medium can be pre-filled into the container under sterile conditions. After incubation of said cells, thereby allowing adhesion to the implant, the container is opened by removing the lid and the septum, the implant is removed and inserted into the target area of a subject. Due to osseointegration, said implant is integrated into the target area.

Example 2

Probing Surface Functionalization Through Au—S Interaction, Followed by Cell Adhesion:

Surface conditioning: The amino acid sequence RGD (Arginine-Glycine-Asparagine) has been described as functional cell adhesion motif through targeting cell adhesion receptors, namely the family of integrins). Two cell adhesion-active peptides are chosen for demonstrating feasibility of the herein described surface-functionalization approach. Approach, Based on a Cell Adhesion Motif, a Subunit from the Matrix Protein Laminin:

Surface conditioning step comprising binding of the Cys-Laminin A chain peptide (Cys-Ser-Arg-Ala-Arg-Lys-Gln-Ala-Ala-Ser-Ile-Lys-Val-Ala-Val-Ser-Ala-Asp-Arg; SEQ ID NO: 1), prone for N-terminal binding via the cysteine on platinum clusters presented on the implant surface.

Reaction conditions: Preparing of a 500 mM peptide solution in sterile phosphate buffer saline (PBS). For immobilization 30-50 µl (1.5-2.5 µg) of peptide solution will be applied on the Pt-doped (doted) ceramic implant surface (area of 19.62 mm$^2$) and incubated for 1-2 h at 37° C. Before using for cell adhesion experiments, the surface was rinsed with PBS.

Approach, Based on a Linker Strategy

Molecular linkers were identified, containing a sulfur moiety for interaction with the noble metal platinum (Pt) and on the other hand, introducing functional groups on Pt-doped (doted) ceramic implant. Exemplary linker molecules are summarised in Table 1 below and the respective chemical reaction scheme is depicted in FIG. 6. These selected linker molecules contain functional groups like carboxyl groups and amino groups. The carboxyl groups of the linkers are activated using EDC (1-ethyl-3-(3-dimethylaminopropyl) carbodiimide) hydrochloride, interacting subsequently with the amino residues of a desired cell binding motif. Thus, a common strategy of surface functionalization is applied via a small linker moiety to generically immobilize cell adhesion molecules.

Binding conditions for sulfur-containing molecules on Pt-doped (doted) implant surface: Cysteine-containing molecules were dissolved at a concentration of 0.5-1 mM in PBS or HEPES and were incubated in room temperature. Cysteine binding was carried out in presence of 1 mM TCEP (Tris(2-carboxyethyl) phosphine hydrochloride) as disulfide reducing agent.

TABLE 1

| Sulfur containing linker molecules | solubility | functional groups to modify | activation method |
|---|---|---|---|
| L-cysteine | water | COOH, —NH$_2$ | EDC, succinic anhydride |
| L-cystine/TCEP | water* | —COOH | EDC |
| N-acetyl-L-cysteine | water*, EtOH | —COOH | EDC |
| α-lipoic acid | water*, EtOH* | —COOH | EDC |

*slightly soluble

Example 3

Activation of Carboxyl Groups with EDC and Immobilizing of Cell Adhesion Peptide GRGDS:

Gly-Arg-Gly-Asp-Ser (SEQ ID NO: 2) peptide sequence is identical to the cell-binding region of the extracellular matrix protein fibronectin. Immobilization of the peptide occurs between the N-terminal amino group of Glycine and activated carboxyl groups on the implant surface and results in the formation of amide bonds.

For activation of exposed Cysteine-carboxyl groups, 30 µl of 100 mM EDC solution in 0.1 M MES are applied, (pH 4.7) on the surface and incubated for 1 hour at room temperature. 1 mM GRGDS stock solution was prepared in PBS and added to the implant surface. The length of incubation period can be extended from 60 min to overnight at room temperature.

After rinsing with sterile phosphate buffer, the RGD functionalized implant can be dried and stored, or directly used for cell culture experiments.

Autoclaving conditions, 120° C., 3 bar for about 20 min are not expected to compromise the binding activity as peptide that small will undergo re-assembly of the functional structure, however, thermal sterilization after surface functionalization might not be possible, if larger protein motifs will be employed.

Example 4

Cell Culture Experiment:

Investigation of cell adhesion and growth behavior of primary osteoblast cells on adhesion-motif—conditioned Pt-doted (doped) ceramic implant surfaces.

The adhesion motif—functionalized surface is immersed in cell culture medium containing the primary osteoblast cell line. Cell adhesion processes are observed with standard light microscopy and fluorescence microscopy in the presence of respective labelling of critical structures, such as nucleus and cytoskeleton. As a reference, non-functionalized surfaces are investigated as well as polyethylene glycol—passivated surfaces (PEG, a classical passivating molecule with non-toxic properties to cells) are used. Additionally, RGD-specific cell adhesion is probed by competition experiments with cell adhesion inhibiting peptides, such as cyclo RGDfV.

Example 5

Human bone forming cells were successfully attached onto the ceramic surface (control), the ceramic-platinum (Pt) surface (control1) resulting in formation of a confluent cell layer (see FIG. 4).

A sulfur (thiol)-alkane component was applied, namely 1-Decanthiol (1 mM in ethanol) on the ceramic-Pt surface and the surface was rinsed to remove excess of the 1-Decanthiol. A moderate increase in contact angle (>10°) was observed, thereby successful binding of the hydrophobic hydrocarbon chains was concluded as hydrophobicity increased.

On sulfur-alkane functionalized surfaces, no cellular interaction was observed. A representative surface from several experimental rounds was investigated by scanning electron microscopy.

Well-known sulfur-containing linker molecules were tested, including L-Cysteine, α-Lipoic acid, N-acetyl-L-Cysteine, Cystamine.

All listed sulfur-containing linker molecules (see Table 1) were prepared with a final concentration of 1 mM in the respective solvent. The ceramic-PT surfaces were immersed for about 24 h and excess of linker material was removed by rinsing. The exposed amino group was activated, followed by conventional succinimide ester coupling with a linear GRGDS peptide moiety, known for cell-adhesion.

With these surfaces, not only successful binding was observed, but it was observed that adhesion on the functionalised surfaces led faster to the expected cell morphologies than on the non-functionalised ceramic surfaces.

With self-assembling of cell adhesion layers by immersion of the surface in resp. aqueous solutions, the universal applicability of the noble metal-sulfur interaction to promote cell binding as a first step in osseointegration was demonstrated.

FIG. 4 presents the results of examples of platinum-doted ceramic surfaces in presence of the human osteoblast cell line, HOB. Cells were previously added for 2-3 hours and incubated in the herein described dental implant container in suitable medium and conditions. Fluorescence imaging was applied to demonstrate viability of the adherent cells by viability marker staining. For better visibility, subsequent fixation followed by scanning electron microscopical analysis was performed. In FIG. 4A, cell adhesion onto an unconditioned platinum-ceramic surface is shown with the cross section of such a surface being outlined below as a graphical depiction. In FIG. 4B, a platinum-ceramic surface with a self-assembled sulfur-alkane layer is shown, where the sulfur-alkane molecules follow smoothly the surface topology, hence is not detectable by the applied method. However, the passivating function of this sulfur-alkane layer results in no cell adhesion, which is clearly observed as no cell attachment occurred even after prolonged exposure to cells. In FIG. 4C, the successful and highly efficient cell adhesion demonstrates the suitability of surface conditioning in which a sulfur-linker molecule (such as L-Cysteine, L-Cystine, α-Lipoic acid, N-acetyl-L-Cysteine and Cystamine) is added to the surface and self-assembly is allowed into an oriented layer with functional carboxyl groups being exposed. By succinimide ester chemistry, a conventional coupling procedure, the amino-termini of linear cell adhesion peptides from the RGD family are chemisorbed, rinsed, and immersed in cell culture medium, and added HOB cells do attach timely forming a confluent cell layer presenting quickly the typical morphology for this cellular species.

The cell-culture compatible vials and cappings of the present application were proven to be suitable to keep cell culture medium in sterile conditions and were suitable for cell growth. The pH indicating colour of the cell culture medium indicated it cell-compatible. The architecture of the container allows the patient's cells to adhere firmly to the implant surface prior to the implantation step. This allows the implant to be at least partially decorated with endogenous individual cells and cell matrix molecules and binding motifs, even though mechanical insertion is likely to remove cells, particularly those exposed on the protruding thread turns.

FIG. 5 demonstrates the successful cell growth on platinum-doted ceramic dental implant surfaces inside the described container in an overnight experiment. The feasibility of the container/surface combination for in vitro cell seeding to achieve dental implants coated with an individualized surface layer of cells or cellular fragments for improved osseointegration, is demonstrated.

SEQUENCE LISTING

Sequence total quantity: 2
SEQ ID NO: 1          moltype = AA   length = 19

-continued

```
FEATURE              Location/Qualifiers
source               1..19
                     mol_type = protein
                     organism = synthetic construct
SEQUENCE: 1
CSRARKQAAS IKVAVSADR                                          19

SEQ ID NO: 2         moltype = AA  length = 5
FEATURE              Location/Qualifiers
source               1..5
                     mol_type = protein
                     organism = synthetic construct
SEQUENCE: 2
GRGDS                                                          5
```

The invention claimed is:

1. A cell culture-compatible dental implant container resistant to temperatures of 100° C. and higher with a dental implant, comprising:
   a cylindrical, optically transparent container with a conically tapered interior for receiving a dental implant,
   a needle-pierceable, flexible, and liquid-tight septum,
   a lid which is separably connected to the container, wherein the interior of the container is configured to fix the position of the dental implant between the bottom of the septum and the bottom of the interior, and
   the dental implant, wherein the dental implant is made of a ceramic, plastic, or a polymeric material and is doted by or comprises a noble metal for self-assembly with one or more cell adhesion motifs, peptides, proteins and/or glycoproteins.

2. The dental implant container according to claim 1, characterized in that the dental implant is made of bioceramic.

3. The dental implant container according to claim 1, characterized in that the noble metal is doted into the dental implant.

4. The dental implant container according to claim 3, characterized in that the noble metal is doted into the dental implant before sintering.

5. The dental implant container according to claim 3, characterized in that the noble metal is doted into the dental implant by sputtering, electrothermal deposition, or chemical deposition.

6. The dental implant container according to claim 1, wherein the noble metal is selected from the group consisting of platinum, titanium, gold, silver, and an alloy of one or more of platinum, titanium, gold, and silver.

7. The dental implant container according to claim 1, characterized in that the noble metal provides binding sites, preferably for binding of proteins, cells or cell extracts, preferably bone-forming cells from blood, plasma, saliva, or tissue, specifically the proteins are selected from extracellular matrix proteins, specifically selected from the group consisting of RGD-peptides, specifically GRGDS, collagen, vitronectin, fibronectin, periostin, F-actin, paxillin, tropoelastin, focal adhesion kinase, integrin, tenascin C, and bone sialoprotein.

8. The dental implant container according to claim 1, characterized in that the dental implant is a ceramic implant, further comprising or doted with titanium, zirconia, platinum, gold or silver molecules.

9. The dental implant container according to claim 8, characterized in that the dental implant comprises sulfur molecules adhesively attached to the surface of said implant, specifically sulfur molecules adhesively attached to a titanium conditioned implant.

10. The dental implant container according to claim 1, characterized in that the container is made of sterilizable glass or plastics.

11. The dental implant container according to claim 1, characterized in that the lid is made of metal, optionally it has a twist lock or flare closure.

12. The dental implant container according to claim 1, characterized in that the septum comprises an inner ring for insertion of the dental implant, allowing free access to the lateral surfaces of said implant.

13. The dental implant container according to claim 1, characterized in that the septum is made of a material selected from the group consisting of silicone, PTFE, rubber, fluoroelastomer, and silicone.

14. The dental implant container according to claim 1, characterized in that it can be sterilized, in particular by radiation, dry heat, wet sterilization, more specifically it can be sterilized two or more times.

15. A method for in vitro coating of a dental implant with cellular material inside a dental implant container, comprising the following sequential steps:
   a) introducing cellular material from a patient sample, wherein the cellular material is from blood, plasma, saliva, biopsy material, tissue or any cell extracts thereof, into the dental implant container according to claim 1 via the septum, and
   b) incubating the dental implant (5) with said cellular material, in the presence of a cell culture medium, further containing an antibiotic, under conditions to allow cell adhesion and growth on the implant surface.

16. The method according to claim 15, characterized in that the cellular material is selected from the group consisting of proteins, cells, cell extracts, specifically the proteins are selected from extracellular matrix proteins, selected from the group consisting of collagen, vitronectin, fibronectin, periostin, F-actin, paxillin, tropoelastin, focal adhesion kinase, integrin, tenascin C, and bone sialoprotein.

17. The method according to claim 15, wherein the dental implant is coated before or after sterilization.

* * * * *